(12) United States Patent
Haldeman et al.

(10) Patent No.: US 10,597,150 B2
(45) Date of Patent: Mar. 24, 2020

(54) ARTICULATED ROTOR SYSTEMS WITH BLADE-TO-BLADE DAMPING

(71) Applicant: Textron Innovations Inc., Providence, RI (US)

(72) Inventors: Andrew Paul Haldeman, Fort Worth, TX (US); Dalton T Hampton, Fort Worth, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 150 days.

(21) Appl. No.: 15/961,713

(22) Filed: Apr. 24, 2018

(65) Prior Publication Data

US 2019/0322363 A1 Oct. 24, 2019

(51) Int. Cl.
*B64C 27/51* (2006.01)
*B64C 27/48* (2006.01)

(52) U.S. Cl.
CPC .............. *B64C 27/51* (2013.01); *B64C 27/48* (2013.01)

(58) Field of Classification Search
CPC ....... B64C 24/48; B64C 24/51; B64C 27/003; B64C 27/35; B64C 27/37; B64C 27/39; B64C 27/48; B64C 27/51; B64C 27/54; B64C 27/635; B64C 11/06; F16F 15/04–08; F16F 15/12; F16F 15/121; F16F 15/123; F16F 15/124; F16F 15/129; F16F 15/133; F16F 15/134; F16F 15/136; F16F 15/137; F16F 15/139; F16F 15/16; F16F 15/167; F16F 15/173; F16F 13/06

USPC ......................................................... 416/105
See application file for complete search history.

(56) References Cited

U.S. PATENT DOCUMENTS

| 4,105,365 A | * | 8/1978 | Ferris ..................... B64C 27/51 |
| | | | 416/107 |
| 4,341,499 A | | 7/1982 | Peterson |
| 4,342,540 A | * | 8/1982 | Lovera .................... B64C 27/35 |
| | | | 416/107 |

(Continued)

OTHER PUBLICATIONS

European Search Report; Application No. EP 18204448.7; European Patent Office; dated May 8, 2019.

(Continued)

*Primary Examiner* — Kenneth J Hansen
*Assistant Examiner* — Justin A Pruitt
(74) *Attorney, Agent, or Firm* — Lawrence Youst PLLC

(57) ABSTRACT

A rotor system includes a yoke, a plurality of blade grip assemblies and a plurality of centrifugal force bearings coupling the blade grip assemblies with the yoke. A plurality of rotor blades are coupled to the blade grip assemblies such that each rotor blade has a coincident hinge and such that each rotor blade has three independent degrees of freedom including blade pitch about a pitch change axis, blade flap about a flapping axis and lead-lag about a lead-lag axis. A blade-to-blade damping ring includes a plurality of damper anchors each coupled to one of the blade grip assemblies along the respective pitch change axis and a plurality of lead-lag dampers each coupled between adjacent damper anchors. During blade pitch operations, each blade grip assembly is operable to rotate relative to the respective damper anchor, such that the blade-to-blade damping ring is operable to provide pitch independent lead-lag damping.

18 Claims, 5 Drawing Sheets

(56) References Cited

U.S. PATENT DOCUMENTS

| | | | |
|---|---|---|---|
| 4,915,585 A * | 4/1990 | Guimbal | B64C 27/51 |
| | | | 416/107 |
| 5,228,834 A | 7/1993 | Yamamoto et al. | |
| 5,372,478 A | 12/1994 | McCafferty | |
| 5,620,305 A | 4/1997 | McArdle | |
| 6,641,365 B2 | 11/2003 | Karem | |
| 7,828,525 B2 | 11/2010 | Stamps et al. | |
| 7,845,909 B2 | 12/2010 | Stamps et al. | |
| 8,181,755 B2 | 5/2012 | Stamps et al. | |
| 8,424,799 B2 | 4/2013 | Popelka et al. | |
| 8,695,917 B2 * | 4/2014 | Cranga | B64C 27/001 |
| | | | 188/379 |
| 8,955,792 B2 | 2/2015 | Schank | |
| 9,126,680 B2 | 9/2015 | Stamps et al. | |
| 9,284,051 B2 | 3/2016 | Amari et al. | |
| 2009/0110555 A1 | 4/2009 | Jones | |
| 2010/0247312 A1 | 9/2010 | Girard et al. | |
| 2013/0004311 A1 | 1/2013 | Stamps et al. | |
| 2013/0105637 A1 | 5/2013 | Stamps et al. | |
| 2014/0248150 A1 | 9/2014 | Sutton et al. | |
| 2015/0122953 A1 | 5/2015 | Burnett et al. | |
| 2015/0251753 A1 | 9/2015 | Jarrett et al. | |
| 2015/0336664 A1 | 11/2015 | Rauber et al. | |
| 2016/0059959 A1 | 3/2016 | Stucki et al. | |
| 2017/0129598 A1 * | 5/2017 | Stucki | B64C 27/48 |
| 2017/0334555 A1 | 11/2017 | Amari et al. | |

OTHER PUBLICATIONS

European Exam Report; Application No. EP 18204448.7; European Patent Office; dated May 27, 2019.

* cited by examiner

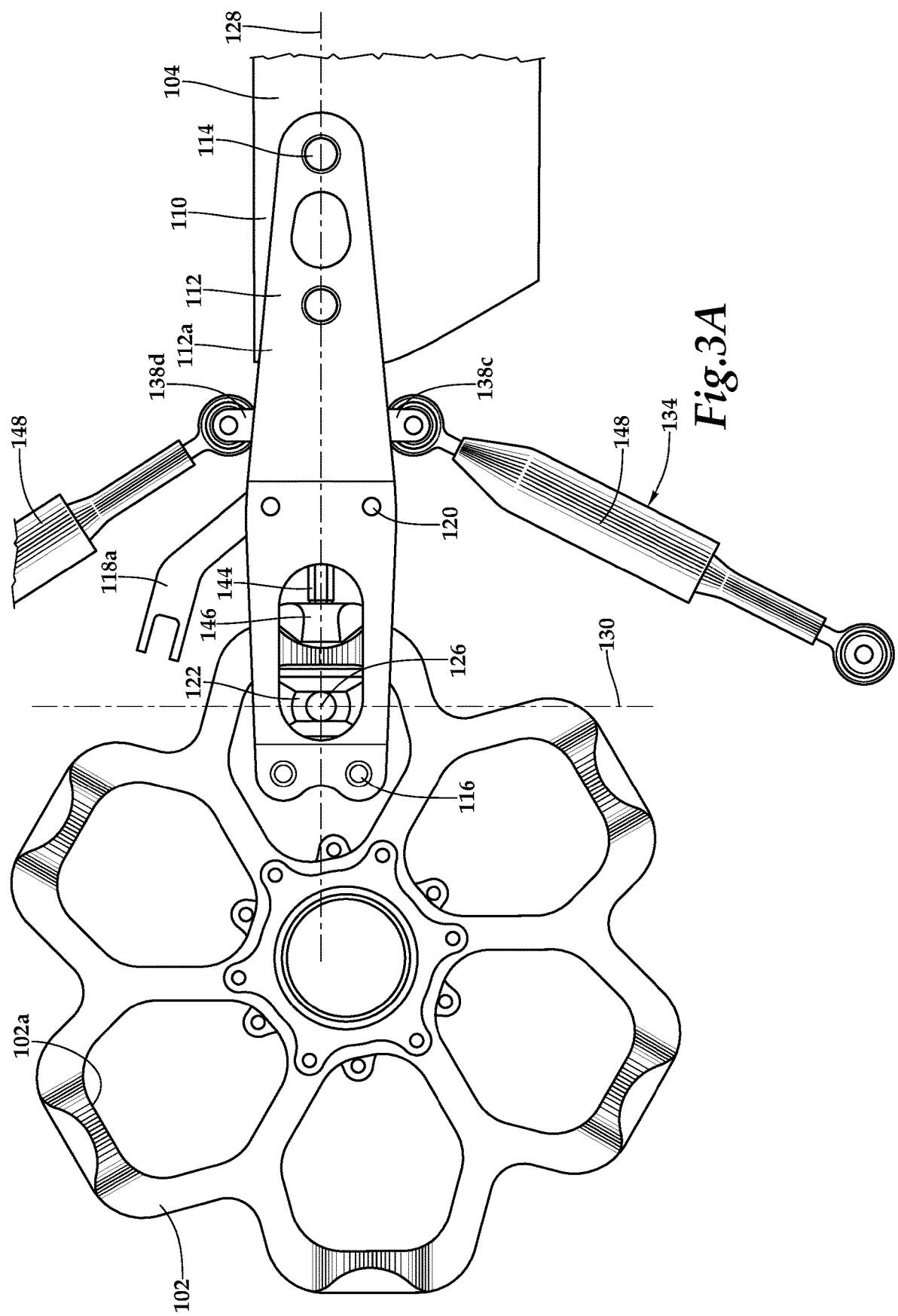

ARTICULATED ROTOR SYSTEMS WITH BLADE-TO-BLADE DAMPING

TECHNICAL FIELD OF THE DISCLOSURE

The present disclosure relates, in general, to rotor systems operable for use on rotorcraft and, in particular, to articulated rotor systems including coincident hinges between the yoke and the rotor blades and having a blade-to-blade damping ring providing pitch independent lead-lag damping.

BACKGROUND

The main rotor of a helicopter typically includes a plurality of rotor blades that are coupled to a rotor hub. This rotor system is mounted on a vertical mast atop the helicopter such that rotation of the rotor system generates vertical lift that supports the weight of the helicopter and lateral thrust that allows the helicopter to engage in forward, backward and sideward flight. Certain main rotors may be articulated rotor systems in which the rotor blades have three degrees of freedom; namely, blade pitch about a pitch change axis, blade flap about a flapping axis and lead-lag about a lead-lag axis. These articulated rotor systems typically include a lead-lag damper for each rotor blade. In addition, these articulated rotor systems may include a separate hinge for each degree of freedom of each rotor blade requiring, for example, twelve hinges in a rotor system having four rotor blades. One option for reducing the complexity of such articulated rotor systems is to use a centrifugal force bearing that provides a coincident hinge for all three degrees of freedom. It has been found, however, that the damping force of the lead-lag dampers in such coincident hinge articulated rotor systems is affected by the pitch of the rotor blades. Therefore, a need has arisen for an improved articulated rotor system in which the damping force of the lead-lag dampers is not affected by the pitch of the rotor blades.

SUMMARY

In a first aspect, the present disclosure is directed to a rotor system operable for use on a rotorcraft. The rotor system includes a yoke, a plurality of blade grip assemblies and a plurality of centrifugal force bearings each coupling one of the blade grip assemblies with the yoke. A plurality of rotor blades are each coupled to one of the blade grip assemblies such that each rotor blade has a coincident hinge located at the respective centrifugal force bearing and such that each rotor blade has three independent degrees of freedom relative to the yoke including blade pitch about a pitch change axis, blade flap about a flapping axis and lead-lag about a lead-lag axis. A blade-to-blade damping ring includes a plurality of damper anchors each coupled to one of the blade grip assemblies along the respective pitch change axis and a plurality of lead-lag dampers each coupled between adjacent damper anchors. Each blade grip assembly is operable to rotate relative to the respective damper anchor during blade pitch operations, such that the blade-to-blade damping ring is operable to provide pitch independent lead-lag damping.

In some embodiments, the yoke may include a plurality of pockets and each centrifugal force bearing may include an outboard bearing support, a spherical bearing and an inboard bearing support. In such embodiments, each of the outboard bearing supports may be coupled to one of the pockets. Also, in such embodiments, each of the blade grip assemblies may be coupled to one of the inboard bearing supports such that, for each rotor blade, the respective blade grip assembly and the respective centrifugal force bearing provide a centrifugal force retention load path from the rotor blade to the yoke. In certain embodiments, a plurality of damper anchor supports are each coupled to one of the blade grip assemblies. In such embodiments, each of the damper anchors is rotatably coupled to one of the damper anchor supports such that each blade grip assembly is operable to rotate relative to the respective damper anchor during blade pitch operations. In some embodiments, each damper anchor support may include a pitch horn that is operable to receive input from a pitch control assembly for blade pitch operations.

In certain embodiments, each damper anchor is coupled to the yoke to prevent relative rotation therebetween. For example, each damper anchor may include a fitting and an anti-rotation rod. Each fitting may include a shaft that extends through the respective damper anchor support and a pair of oppositely disposed clevises extending in an in-plane direction. Each anti-rotation rod may couple the respective fitting and the yoke to prevent relative rotation therebetween. In such embodiments, each lead-lag damper may be coupled to devises of adjacent fittings using, for example, a spherical bearing coupling. In some embodiments, each lead-lag damper has an in-plane spring rate that is independent of blade pitch. In certain embodiments, each lead-lag damper may include an elastomer spring having an in-plane spring rate operable to provide lead-lag damping to the respective rotor blades. In other embodiments, each lead-lag damper may include a mechanical spring having an in-plane spring rate operable to provide lead-lag damping to the respective rotor blade. In further embodiments, each lead-lag damper may include a fluid spring having an in-plane spring rate operable to provide lead-lag damping to the respective rotor blade.

In a second aspect, the present disclosure is directed to a rotorcraft that includes a fuselage, a power system disposed within the fuselage, a mast coupled to the power system and a yoke coupled to the mast and operable to rotate therewith. A plurality of centrifugal force bearings each couples a blade grip assembly with the yoke. A plurality of rotor blades are each coupled to one of the blade grip assemblies such that each rotor blade has a coincident hinge located at the respective centrifugal force bearing and such that each rotor blade has three independent degrees of freedom relative to the yoke including blade pitch about a pitch change axis, blade flap about a flapping axis and lead-lag about a lead-lag axis. A blade-to-blade damping ring includes a plurality of damper anchors each coupled to one of the blade grip assemblies along the respective pitch change axis and a plurality of lead-lag dampers each coupled between adjacent damper anchors. Each blade grip assembly is operable to rotate relative to the respective damper anchor during blade pitch operations, such that the blade-to-blade damping ring is operable to provide pitch independent lead-lag damping.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3C are various views of component parts of an articulated rotor system with pitch independent blade-to-blade damping in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1A:
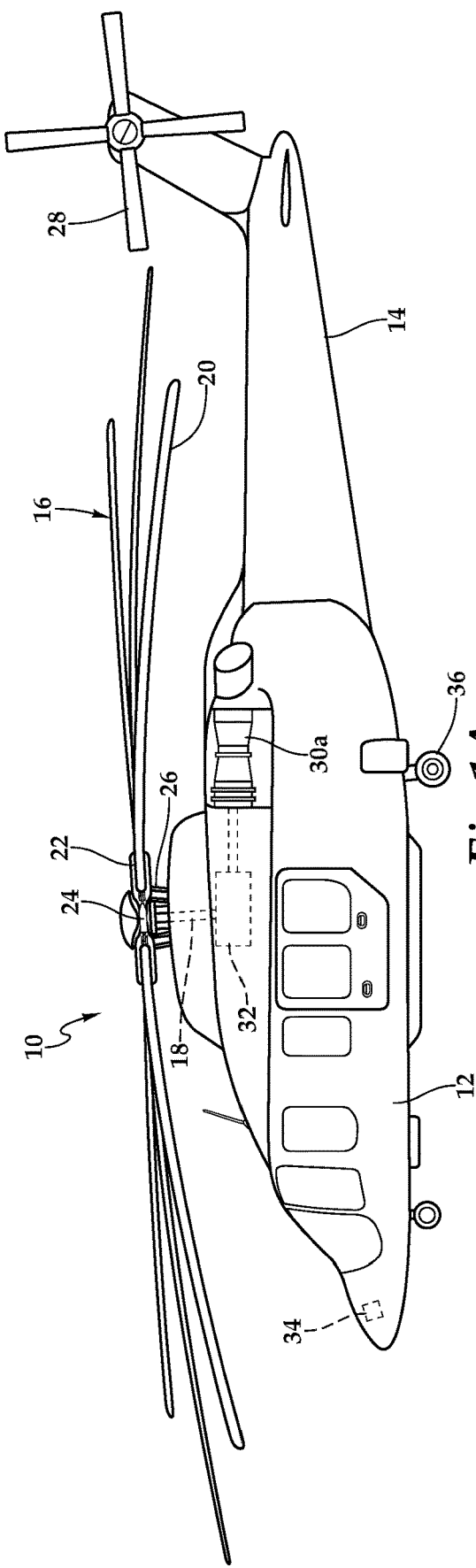
FIGS. 1A-1B are schematic illustrations of a helicopter having an articulated rotor system with pitch independent blade-to-blade damping in accordance with embodiments of the present disclosure.
Figure 1B:
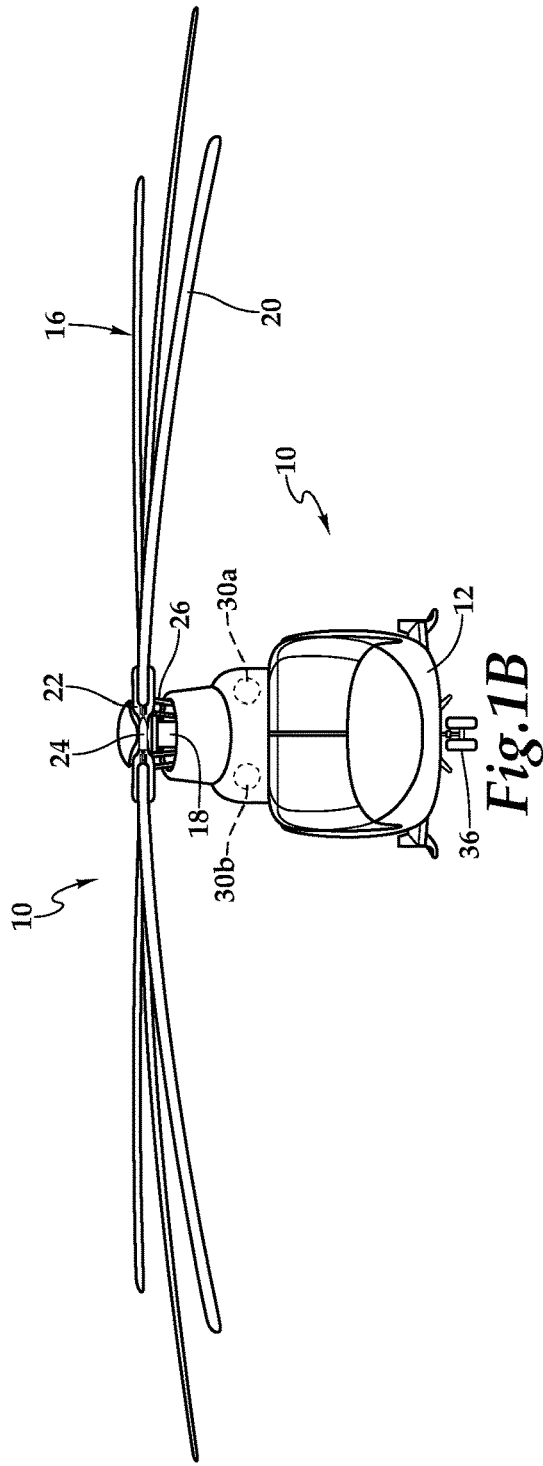

Referring now to FIGS. 1A-1B in the drawings, a rotorcraft depicted as helicopter 10 is schematically illustrated. Helicopter 10 includes a body depicted as fuselage 12 and tailboom 14. Helicopter 10 includes a rotor system depicted as main rotor 16 that is supported atop helicopter 10 by a mast 18. Main rotor 16 includes six rotor blades 20 coupled to a rotor hub 22 including a blade-to-blade damping ring 24 operable to provide pitch independent lead-lag damping. The pitch of rotor blades 20 can be collectively and cyclically manipulated by a pitch control assembly 26 including, for example, a rise and fall swashplate. Helicopter 10 includes an anti-torque system depicted as tail rotor 28. Torque and rotational energy is provided to main rotor 16 through mast 18 from a power system depicted as engines 30a, 30b and a main gearbox 32. Main gearbox 32 includes gear systems such as a gear reducing transmission designed to enable optimum engine speed and optimal rotor speed during flight operations. In the illustrated embodiment, engines 30a, 30b are depicted as power turbine engines. The angular velocity or revolutions per minute (RPM) of main rotor 16, the pitch of rotor blades 20 and the like are determined using a flight control system 34, with or without pilot input, to selectively control the direction, thrust and lift of helicopter 10 during flight. Helicopter 10 has a landing gear system 36 to provide ground support for the aircraft.

Even though the rotor system of the present disclosure has been depicted and described as having a particular number of rotor blades, it should be understood by those having ordinary skill in the art that, a rotor system of the present disclosure could have alternate numbers of rotor blades both greater than or less than six. Also, even through the rotor system of the present disclosure has been depicted and described as be being the main rotor of a helicopter, it should be understood by those having ordinary skill in the art that the teachings of certain embodiments relating to the rotor systems described herein may apply to other rotor systems, including, but not limited to, helicopter tail rotors, proprotors for tiltrotor aircraft, rotor systems for quad and multi rotor aircraft and the like. In addition, it should be understood by those having ordinary skill in the art that the teachings of certain embodiments relating to the rotor systems of the present disclosure described herein may apply to both manned and unmanned aircraft.

In general, rotor systems for rotorcraft should be designed to achieve blade flap or out-of-plane frequencies and lead-lag or in-plane frequencies that are sufficiently distant from the excitation frequencies generated by the rotor systems corresponding to 1/rev (1 per revolution), 2/rev, 3/rev, etc. As an example, if a rotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a rotor system will result in a proportional change in the excitation frequencies generated by the rotor system. Preferably, rotor blades 20 are formed from a high-strength and lightweight material. For example, the structural components of rotor blades 20 may be formed from carbon-based materials such as graphite-based materials, graphene-based materials or other carbon allotropes including carbon nanostructure-based materials such as materials including single-walled and multi-walled carbon nanotubes. Rotor blades 20 are preferably designed to a desired in-plane stiffness such that when operated within the rotor systems of the present disclosure, the first-in-plane lead-lag frequency of rotor blades 20 is decoupled from the per revolution excitations frequencies and the out-of-plane flapping frequency.

Figure 2A:
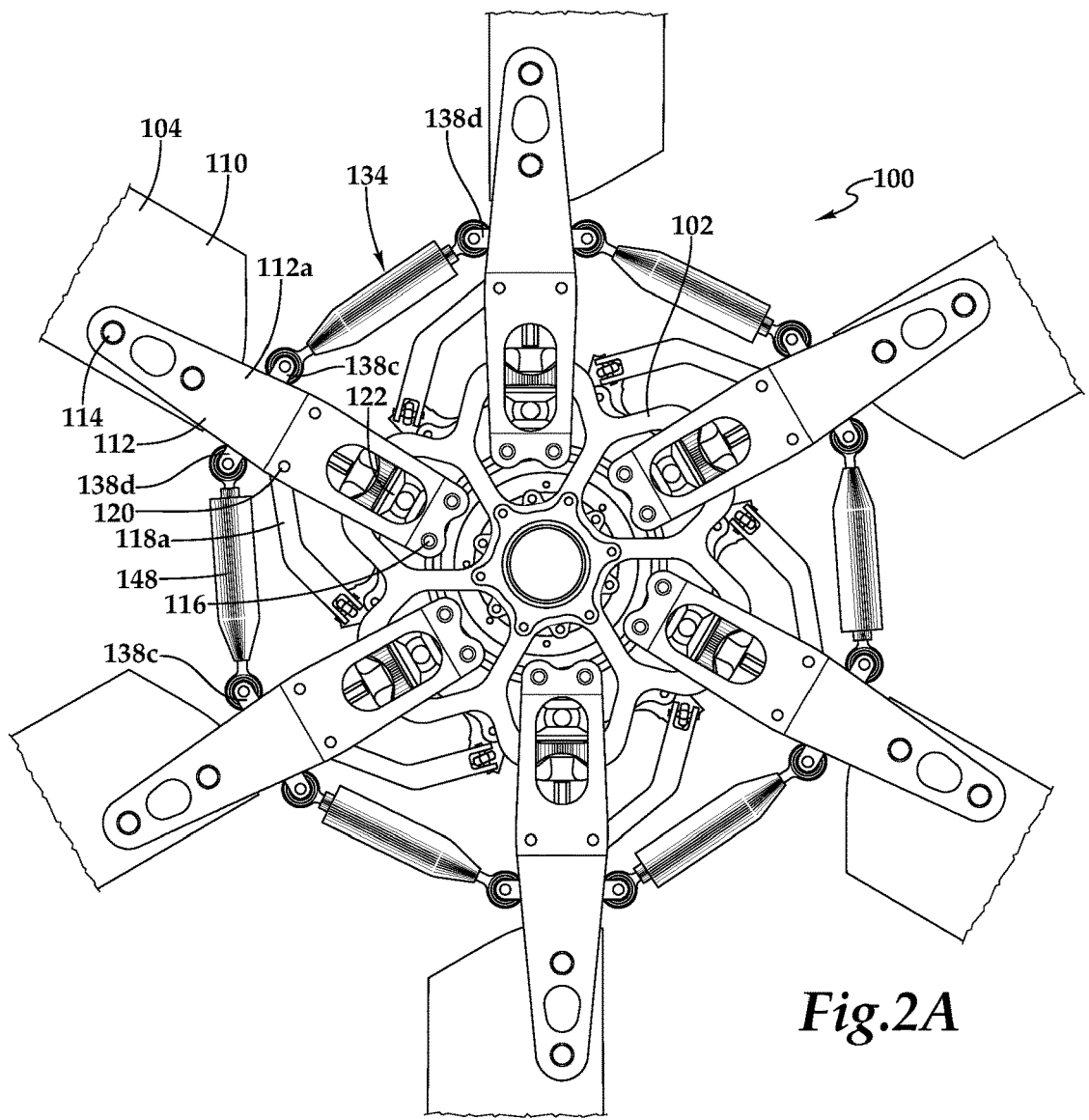
FIGS. 2A-2B are top and sides views of an articulated rotor system with pitch independent blade-to-blade damping in accordance with embodiments of the present disclosure.
Figure 2B:
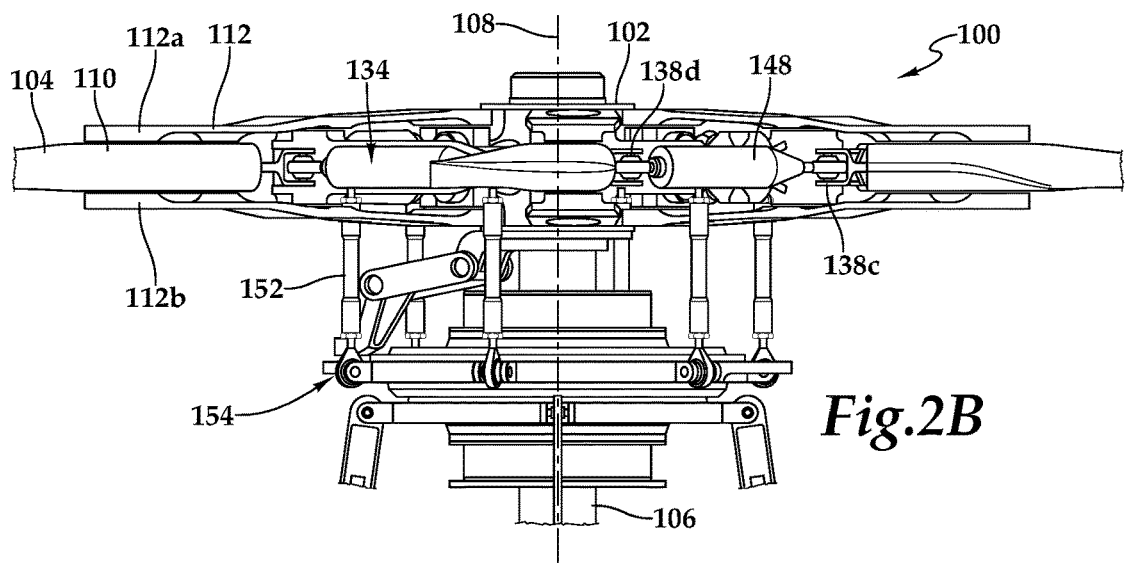
Figure 3B:
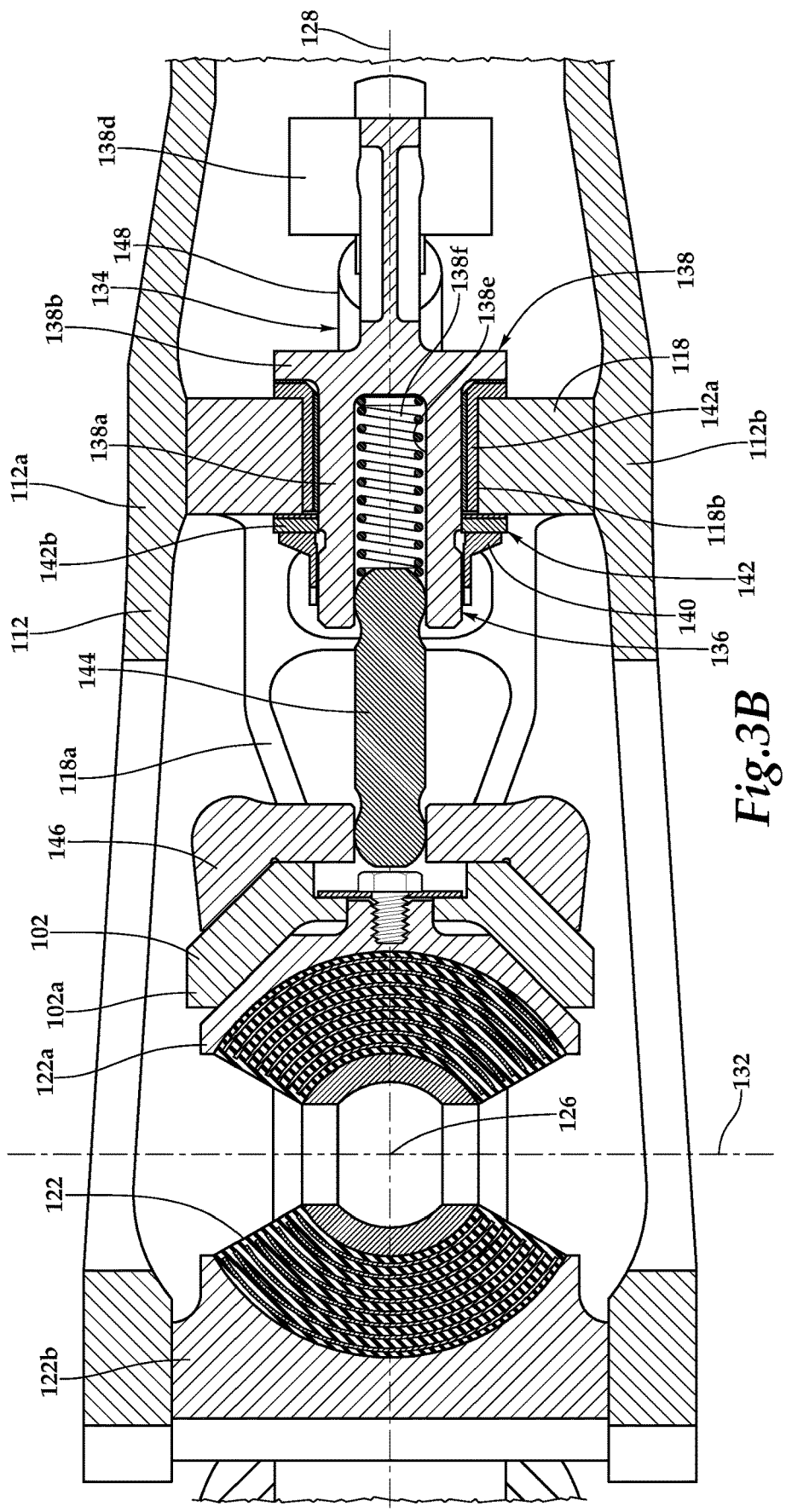

Referring next to FIGS. 2A-2B and 3A-3C in the drawings, an articulated rotor system with pitch independent blade-to-blade damping is depicted and generally designated 100. In the illustrated embodiment, rotor system 100 includes a yoke 102 having six rotor blades 104 coupled thereto. As best seen in FIG. 3A-3B, yoke 102 includes six pockets 102a. A mast 106 couples rotor system 100 to the power system of the rotorcraft including an engine and transmission that provide torque and rotational energy to rotor system 100 to enable rotation about a rotational axis 108. In the illustrated embodiment, each rotor blade 104 includes a root section 110 that is coupled to a respective blade grip assembly 112 using connecting members 114 such as pins, bolts or other suitable means. As best seen in FIG. 3B, each blade grip assembly 112 includes an upper grip plate 112a and a lower grip plate 112b. A damper anchor support 118 is coupled between each upper and lower grip plate 112a, 112b using connecting members 120 such as pins, bolts or other suitable means. In the illustrated embodiment, each damper anchor support 118 includes a pitch horn 118a and a central opening 118b.

Each blade grip assembly 112 is coupled to yoke 102 by a centrifugal force bearing 122. As illustrated, each centrifugal force bearing 122 is a twin spherical bearing having an outboard bearing support 122a and an inboard bearing support 122b. Each inboard bearing support 122b is coupled between an upper and a lower grip plate 112a, 112b using connecting members 116 such as pins, bolts or other suitable means. The inboard spherical surface of each twin spherical bearing corresponds to a spherical surface of inboard bearing support 122b and the outboard spherical surface of each twin spherical bearing corresponds to a spherical surface of outboard bearing support 122a. The connections between the twin spherical bearing and the bearing supports are permanent and may be made by vulcanizing the elastomeric material of each twin spherical bearing directly on these surfaces or by bonded, adhered or otherwise secured the elastomeric material in a non-removable manner to these surfaces. Centrifugal force bearings 122 may include a plurality of rigid shims disposed between layers of the elastomeric material. The durometer and thickness of the materials as well as the stiffness, softness and/or spring rate of centrifugal force bearings 122 may be tailored to achieve the desired operational modes based upon the loads and motions expected in the particular application. In operation, each centrifugal force bearing 122 is operable to provide a centrifugal force retention load path from a rotor blade 104 to yoke 102 via a blade grip assembly 112.

Figure 3C:
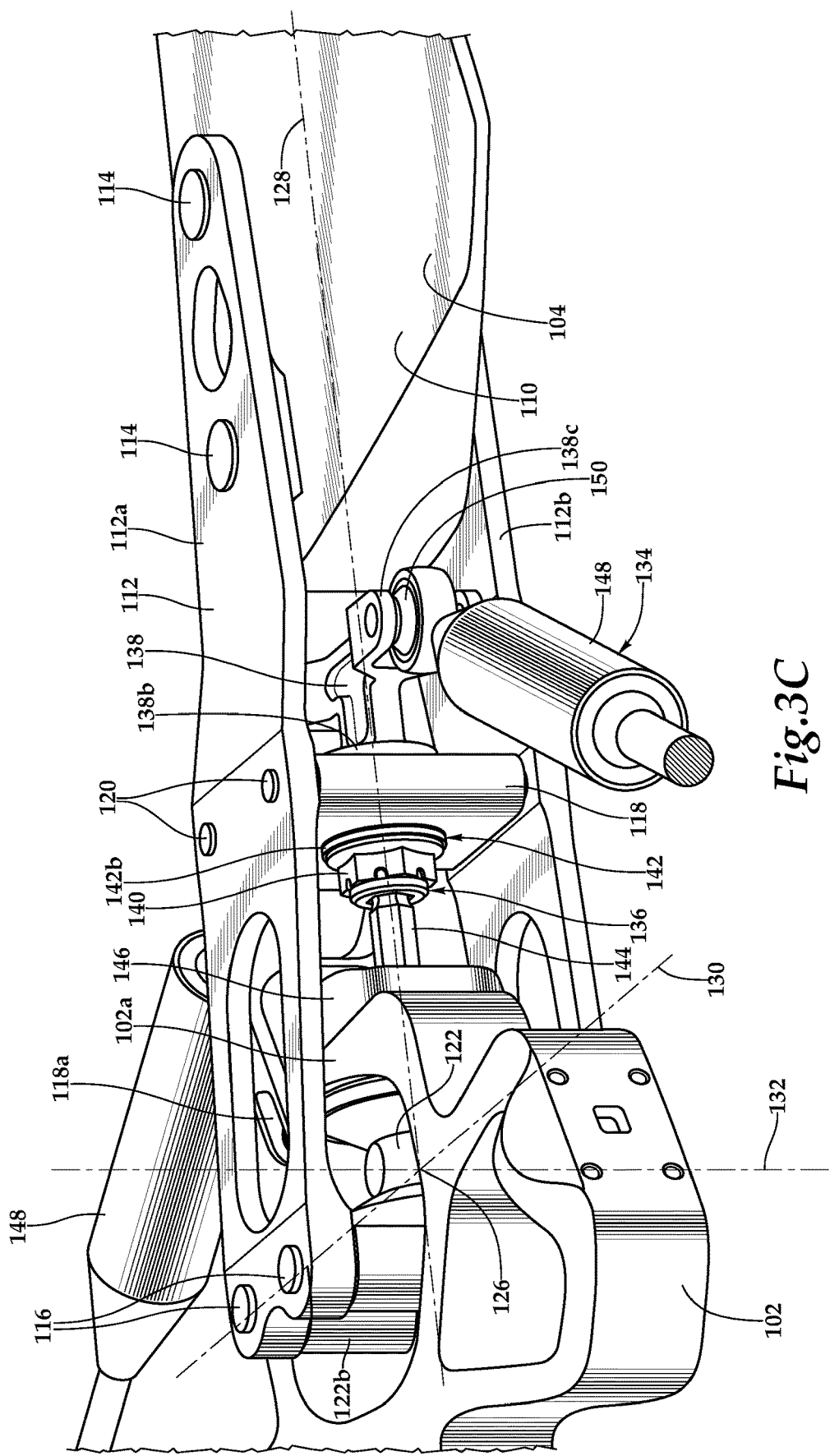

Each centrifugal force bearing 122 provides a coincident hinge with a center point 126 for the pitch change degree of freedom, the flapping degree of freedom and the lead-lag degree of freedom of the respective rotor blade 104 relative to yoke 102. As best seen in FIG. 3C, pitch change axis 128, flapping axis 130 and lead-lag axis 132 all pass through coincident hinge point 126. As such, centrifugal force bearings 122 allow each rotor blade 104 to move independent of the other rotor blades 104 and independent of yoke 102 with a pitch change degree of freedom, a flapping degree of freedom and a lead-lag degree of freedom about coincident hinge point 126.

As best seen in FIG. 2A, rotor system 100 includes a blade-to-blade damping ring 134 that provides pitch independent lead-lag damping for rotor blades 104. Blade-to-blade damping ring 134 includes a damper anchor 136 coupled to each of the blade grip assemblies 112 along the respective pitch change axis 128, as best seen in FIGS. 3B-3C. Each damper anchor 136 includes a fitting 138 having a hollow shaft 138a that extends through central opening 118b of the respective damper anchor support 118. In the illustrated embodiment, spanwise movement of fitting 138 is prevented by an outboard flange 138b and an inboard nut 140. Preferably, a bearing system 142 such as a rotary bearing 142a and/or an inboard thrust bearing 142b provides low friction contact between fitting 138 and damper anchor support 118. The outboard end of each fitting 138 includes oppositely disposed devises 138c, 138d that extend in the in-plane direction of rotor system 100, as best seen in FIG. 3A. Each damper anchor 136 also includes an anti-rotation rod 144 that couples each fitting 138 to yoke 102 to prevent relative rotation therebetween. In the illustrated embodiment, each anti-rotation rod 144 is depicted as a hex rod extending between a bearing cap 146, which is coupled to an outboard surface of yoke 102, and the inner cavity 138e of a fitting 138. A spring 138f may be disposed within inner cavity 138e to support anti-rotation rod 144. The hex rods prevent relative rotation between each fitting 138 and yoke 102 but may allow certain movement in the in-plane (lead-lag) and/or out-of-plane (flapping) directions.

Blade-to-blade damping ring 134 also includes a lead-lag damper 148 extending between each pair of adjacent damper anchors 136. In the illustrated embodiment, each lead-lag damper 148 is coupled between a clevis 138c of a first damper anchor 136 and a clevis 138d of a second damper anchor 136, as best seen in FIG. 2A. As best seen in FIG. 3C, the couplings between lead-lag dampers 148 and damper anchors 136 include spherical bearings 150 to allow certain degrees of freedom therebetween such as during blade flapping to minimize blade flap and lead-lag coupling. Each lead-lag damper 148 has an in-plane spring rate operable to apply a damping force to the lead-lag degree of freedom of the rotor blades 104 to reduce the in-plane oscillation of the rotor blades 104. The stiffness, softness and/or in-plane spring rate of lead-lag dampers 148 may be tailored to achieve the desired operational modes based upon the loads and motions expected in the particular application. In one example, lead-lag dampers 148 may be elastomeric dampers with an in-plane spring rate operable to provide lead-lag damping to the rotor blades 104 responsive to shearing of elastomeric layers. In another example, lead-lag dampers 148 may have mechanical springs with an in-plane spring rate operable to provide lead-lag damping to the rotor blades 104. In a further example, lead-lag dampers 148 may be fluid springs having an in-plane spring rate operable to provide lead-lag damping to the rotor blades 104. In a yet another example, lead-lag dampers 148 may be mechanical springs in combination with fluid springs having an in-plane spring rate operable to provide lead-lag damping to the rotor blades 104.

As discussed herein, each damper anchor support 118 includes a pitch horn 118a that is coupled to a pitch link 152 of a pitch control assembly 154 depicted as a rise and fall swash plate operable to collectively and/or cyclically control the pitch of rotor blades 104, as best seen in FIG. 2B. Each rotor blade 104 is operable to independently rotate about its pitch change axis 128 relative to other rotor blades 104 and yoke 102, changing pitch responsive to changes in position of the respective pitch link 152. During pitch change operations, blade grip assemblies 112 rotate relative to damper anchors 136 which are inline with pitch change axes 128 and are rotationally fixed relative to yoke 102 such that devises 138c, 138d remain extended in the in-plane direction of rotor system 100. As such, rotation of blade grip assemblies 112 responsive to pitch change operations does not affect the in-plane spring rate of lead-lag dampers 148. During flight operations, rotor blades 104 may tend to oscillate forward to a lead position and backwards to a lag position as rotor system 100 rotates as a result of conservation of momentum and acceleration/deceleration caused by the Coriolis effect. Lead-lag dampers 148 have an in-plain spring rate operable to apply a damping force to prevent excess back and forth movement of rotor blades 104. As discussed herein, the lead-lag damping force is unaffected by and/or independent of the flapping degree of freedom of rotor blades 104. In addition, as discussed herein, the lead-lag damping force is unaffected by and/or independent of the pitch change degree of freedom of rotor blades 104.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor system operable for use on a rotorcraft, the rotor system comprising:
   a yoke;
   a plurality of blade grip assemblies;
   a plurality of centrifugal force bearings each coupling one of the blade grip assemblies with the yoke;
   a plurality of rotor blades each coupled to one of the blade grip assemblies such that each rotor blade has a coincident hinge located at the respective centrifugal force bearing and such that each rotor blade has three independent degrees of freedom relative to the yoke including blade pitch about a pitch change axis, blade flap about a flapping axis and lead-lag about a lead-lag axis; and
   a blade-to-blade damping ring including a plurality of damper anchors each coupled to one of the blade grip assemblies along the respective pitch change axis and a plurality of lead-lag dampers each coupled between adjacent damper anchors;
   wherein, each damper anchor is coupled to the yoke to prevent relative rotation therebetween; and
   wherein, each blade grip assembly is operable to rotate relative to the respective damper anchor during blade pitch operations, such that the blade-to-blade damping ring is operable to provide pitch independent lead-lag damping.

2. The rotor system as recited in claim 1 wherein the yoke further comprises a plurality of pockets, wherein each centrifugal force bearing further comprises an outboard bearing support, a spherical bearing and an inboard bearing support and wherein each of the outboard bearing supports is coupled to one of the pockets.

3. The rotor system as recited in claim 2 wherein each of the blade grip assemblies is coupled to one of the inboard bearing supports.

4. The rotor system as recited in claim 3 wherein, for each rotor blade, the respective blade grip assembly and the respective centrifugal force bearing provide a centrifugal force retention load path from the rotor blade to the yoke.

5. The rotor system as recited in claim 1 further comprising a plurality of damper anchor supports each coupled to one of the blade grip assemblies and wherein each of the damper anchors is rotatably coupled to one of the damper anchor supports such that each blade grip assembly is operable to rotate relative to the respective damper anchor during blade pitch operations.

6. The rotor system as recited in claim 5 wherein each damper anchor support further comprises a pitch horn.

7. The rotor system as recited in claim 6 wherein each pitch horn is operable to receive input from a pitch control assembly for blade pitch operations.

8. The rotor system as recited in claim 5 wherein each damper anchor further comprises a fitting and an anti-rotation rod, each fitting having a shaft that extends through the respective damper anchor support and a pair of oppositely disposed devises extending in an in-plane direction, each anti-rotation rod coupling the respective fitting and the yoke to prevent relative rotation therebetween.

9. The rotor system as recited in claim 8 wherein each lead-lag damper is coupled between devises of adjacent fittings.

10. The rotor system as recited in claim 9 wherein each of the couplings between the lead-lag dampers and the devises of fittings further comprises a spherical bearing.

11. The rotor system as recited in claim 1 wherein each lead-lag damper further comprises an in-plane spring rate that is independent of blade pitch.

12. The rotor system as recited in claim 1 wherein each lead-lag damper further comprises an elastomer spring having an in-plane spring rate operable to provide lead-lag damping to the respective rotor blades.

13. The rotor system as recited in claim 1 wherein each lead-lag damper further comprises a mechanical spring having an in-plane spring rate operable to provide lead-lag damping to the respective rotor blade.

14. The rotor system as recited in claim 1 wherein each lead-lag damper further comprises a fluid spring having an in-plane spring rate operable to provide lead-lag damping to the respective rotor blade.

15. A rotorcraft comprising:
   a fuselage;
   a power system disposed within the fuselage;
   a mast coupled to the power system;
   a yoke coupled to the mast and operable to rotate therewith;
   a plurality of blade grip assemblies;
   a plurality of centrifugal force bearings each coupling one of the blade grip assemblies with the yoke;
   a plurality of rotor blades each coupled to one of the blade grip assemblies such that each rotor blade has a coincident hinge located at the respective centrifugal force bearing and such that each rotor blade has three independent degrees of freedom relative to the yoke including blade pitch about a pitch change axis, blade flap about a flapping axis and lead-lag about a lead-lag axis; and
   a blade-to-blade damping ring including a plurality of damper anchors each coupled to one of the blade grip assemblies along the respective pitch change axis and a plurality of lead-lag dampers each coupled between adjacent damper anchors;
   wherein, each damper anchor is coupled to the yoke to prevent relative rotation therebetween; and
   wherein, each blade grip assembly is operable to rotate relative to the respective damper anchor during blade pitch operations, such that the blade-to-blade damping ring is operable to provide pitch independent lead-lag damping.

16. The rotorcraft as recited in claim 15 further comprising a plurality of damper anchor supports each coupled to one of the blade grip assemblies and wherein each of the damper anchors is rotatably coupled to one of the damper anchor supports such that each blade grip assembly is operable to rotate relative to the respective damper anchor during blade pitch operations.

17. The rotorcraft as recited in claim 16 wherein each damper anchor support further comprises a pitch horn that is operable to receive input from a pitch control assembly for blade pitch operations.

18. The rotorcraft as recited in claim 15 wherein each lead-lag damper further comprises an in-plane spring rate that is independent of blade pitch.

* * * * *

UNITED STATES PATENT AND TRADEMARK OFFICE
CERTIFICATE OF CORRECTION

PATENT NO. : 10,597,150 B2  
APPLICATION NO. : 15/961713  
DATED : March 24, 2020  
INVENTOR(S) : Haldeman et al.

Page 1 of 1

It is certified that error appears in the above-identified patent and that said Letters Patent is hereby corrected as shown below:

In the Specification

Column 2, Line 23: "devises" should read --clevises--

Column 5, Line 58: "devises" should read --clevises--

Column 6, Line 45: "devises" should read --clevises--

In the Claims

Column 8, Line 3: "devises" should read --clevises--

Column 8, Line 7: "devises" should read --clevises--

Column 8, Line 10: "devises" should read --clevises--

Signed and Sealed this  
Nineteenth Day of May, 2020

Andrei Iancu  
*Director of the United States Patent and Trademark Office*